(12) United States Patent
Schulz et al.

(10) Patent No.: US 11,658,551 B2
(45) Date of Patent: May 23, 2023

(54) ELECTRIC MOTOR VEHICLE AUXILIARY UNIT

(71) Applicant: PIERBURG PUMP TECHNOLOGY GMBH, Neuss (DE)

(72) Inventors: Christian Schulz, Duisburg (DE); Peter Gross, Erkrath (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 439 days.

(21) Appl. No.: 16/975,393

(22) PCT Filed: Feb. 28, 2018

(86) PCT No.: PCT/EP2018/054902
§ 371 (c)(1),
(2) Date: Aug. 25, 2020

(87) PCT Pub. No.: WO2019/166080
PCT Pub. Date: Sep. 6, 2019

(65) Prior Publication Data
US 2021/0036586 A1    Feb. 4, 2021

(51) Int. Cl.
*H02K 11/40*    (2016.01)
*H02K 11/33*    (2016.01)
(Continued)

(52) U.S. Cl.
CPC .............. *H02K 11/40* (2016.01); *B60K 25/00* (2013.01); *H02K 5/203* (2021.01); *H02K 5/225* (2013.01); *H02K 11/33* (2016.01); *H02K 9/223* (2021.01)

(58) Field of Classification Search
CPC ........ H02K 11/40; H02K 11/33; H02K 9/223; H02K 5/22; H02K 5/225; H02K 5/128;
(Continued)

(56) References Cited

U.S. PATENT DOCUMENTS 5,982,253 A    11/1999  Perrin et al.
6,019,614 A    2/2000   Baur et al.
(Continued)

FOREIGN PATENT DOCUMENTS

CN    101791974 A    8/2010
EP    2 053 726 A2    4/2009
(Continued)

OTHER PUBLICATIONS

Marzog et al, Auxiliary Device for Motor Vehicle, Apr. 30, 2014, EP 2725691 (English Machine Translation) (Year: 2014).*

*Primary Examiner* — Alexander A Singh
(74) *Attorney, Agent, or Firm* — Norman B. Thot

(57) ABSTRACT

An electric motor vehicle auxiliary unit includes a housing which is at least partly electrically conductive. An electric drive motor having stator-side motor coils, a unit mechanism which is driven by the electric drive motor, and a motor electronics circuit board are each arranged within the housing. The motor electronics circuit board includes motor electronics having control and power electronics which control the electric drive motor, and at least one housing ground connection which is electrically conductively connected directly to the housing via a housing ground element. A punch comb arrangement has at least two plug pins. A plug connection connects the motor electronics circuit board to an engine control unit. The plug connection is electrically connected to the motor electronics circuit board via the punch comb arrangement. The housing ground element is designed as a plug pin of the at least two plug pins of the punch comb arrangement.

9 Claims, 2 Drawing Sheets

(51) Int. Cl.
*B60K 25/00* (2006.01)
*H02K 5/20* (2006.01)
*H02K 5/22* (2006.01)
*H02K 9/22* (2006.01)

(58) Field of Classification Search
CPC .. H02K 5/00; H02K 9/00; H02K 9/02; H02K 9/04; H02K 9/06; H02K 9/08; H02K 9/10; H02K 9/12; H02K 9/14; H02K 9/16; H02K 9/18; H02K 9/19; H02K 9/193; H02K 9/197; B60K 25/00
USPC .......................................................... 310/71
See application file for complete search history.

(56) References Cited

U.S. PATENT DOCUMENTS

| | | | |
|---|---|---|---|
| 6,528,915 B1* | 3/2003 | Moskob | H02K 11/40 |
| | | | 439/95 |
| 2005/0189829 A1* | 9/2005 | Thomson | H02K 11/026 |
| | | | 310/239 |
| 2010/0118503 A1 | 5/2010 | Kellermann | |
| 2014/0010684 A1 | 1/2014 | Joschko et al. | |
| 2014/0030124 A1 | 1/2014 | Hoj et al. | |
| 2016/0248292 A1 | 8/2016 | Takarai | |

FOREIGN PATENT DOCUMENTS

| | | | | |
|---|---|---|---|---|
| EP | 2 725 691 A1 | 4/2014 | | |
| EP | 2725691 A1 * | 4/2014 | ......... | H02K 11/0141 |
| GB | 2 445 775 A | 7/2008 | | |
| JP | 2008-35629 A | 2/2008 | | |
| JP | 2010-161863 A | 7/2010 | | |

* cited by examiner

ELECTRIC MOTOR VEHICLE AUXILIARY UNIT

CROSS REFERENCE TO PRIOR APPLICATIONS

This application is a U.S. National Phase application under 35 U.S.C. § 371 of International Application No. PCT/EP2018/054902, filed on Feb. 28, 2018. The International Application was published in German on Sep. 6, 2019 as WO 2019/166080 A1 under PCT Article 21(2).

FIELD

The present invention relates to an electric motor vehicle auxiliary unit, for example, to an electrically driven pump, in particular a liquid pump, to an electric valve, an electric flap, or to other electric actuators.

BACKGROUND

The great number of small and larger electrical components and motor vehicle auxiliary units in a motor vehicle places high demands on the electrical interference suppression of electrical motor vehicle auxiliary units. Many electrical auxiliary units, in particular pumps, are constructed so that a motor electronics chamber, in which a motor electronics board comprising the motor electronics and in particular the power electronics for the control of the motor coils are arranged, adjoins the electric drive motor, including the motor coils. The drive motor, including the motor coils, and the motor electronics chamber are separated from each other by a partition.

An important measure in electrical interference suppression is a good and low-resistance ground contact of the electrically conductive housing and the circuit ground on the motor electronics board with each other and with the electrical ground of the vehicle.

EP 2 476 914 A1 describes an electrical motor vehicle auxiliary unit which is designed as a coolant pump.

EP 2 053 726 A2 describes a mechanically commutated DC motor in which the motor brushes are optionally connected to the vehicle ground or to the vehicle battery voltage via suppression chokes.

DE 19728291 describes a three-armed ground connector for the electrical and mechanical connection of a circuit board or the circuit board ground to a metal housing.

EP 2 187 718 describes an electrical coolant pump comprising a motor electronics circuit board which is fixed on a partitioning wall by its non-equipped side.

U.S. Pat. No. 5,982,253 describes an interference suppression device for an electronically commutated electric motor comprising an electrically conductive housing, wherein, separate contact pads for housing contacting, motor connection, and power supply are provided on an interference suppression circuit board, the separate contact pads being connected to each another by filter elements.

SUMMARY

An aspect of the invention is to provide an interference-free electric motor vehicle auxiliary unit comprising an electric drive motor, in which the housing ground element is designed in a particularly simple manner and is thus simple and inexpensive to assemble.

In an embodiment, the present invention provides an electric motor vehicle auxiliary unit which includes an auxiliary unit housing which is configured to be at least partly electrically conductive. An electric drive motor, a unit mechanism, and a motor electronics circuit board are each arranged within the auxiliary unit housing. The electric drive motor comprises stator-side motor coils. The unit mechanism is configured to be driven by the electric drive motor. The motor electronics circuit board comprises motor electronics comprising control and power electronics which are configured to control the electric drive motor, and at least one housing ground connection which is connected in an electrically conductive manner directly to the auxiliary unit housing via a housing ground element. A punch comb arrangement comprises at least two plug pins. A plug connection is configured to connect the motor electronics circuit board to an engine control unit. The plug connection is electrically connected to the motor electronics circuit board via the punch comb arrangement. The housing ground element is designed as a plug pin of the at least two plug pins of the punch comb arrangement.

BRIEF DESCRIPTION OF THE DRAWINGS

The present invention is described in greater detail below on the basis of embodiments and of the drawings in which.

DETAILED DESCRIPTION

Figure 1:
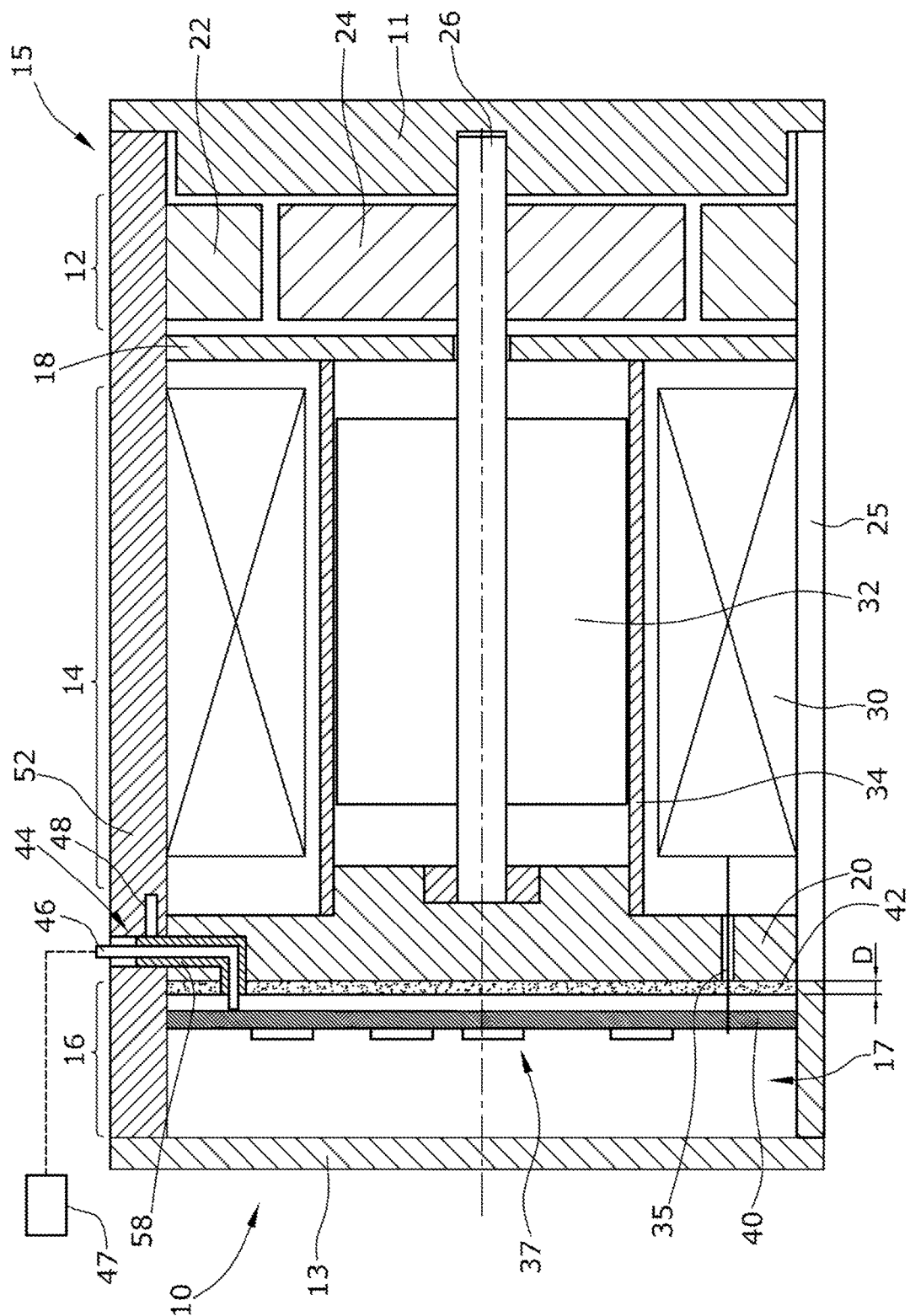
FIG. 1 shows a schematic longitudinal section of an electric motor vehicle auxiliary unit including a motor electronics circuit board.

In an embodiment of the present invention, the housing ground element is designed as a plug pin of the punch comb arrangement. The ground connection can thus be quickly and directly established. An improvement in EMC can be achieved due to a short and low-resistance ground connection. Because screws are omitted for the ground connection, components can be reduced and the manufacturing process shortened. Screwing can also be omitted as an assembly step which, besides saving time, leads to increased cleanliness because of the absence of chips. The omission of screws also leads to space being saved on the motor electronics circuit board.

The electric motor vehicle auxiliary unit can basically be any type of auxiliary unit, for example, an electric valve, an electric flap or another electric actuator, or a fluid pump, in particular a liquid pump, specifically a lubricant pump, a coolant pump or a fuel pump. The drive motor can be configured as a dry runner in the case of a liquid pump, but in particular also as a wet runner.

The electric motor vehicle auxiliary unit comprises an electric drive motor with a plurality of motor coils, a unit mechanism driven by the drive motor, and a motor electronics circuit board with motor electronics for the control of the drive motor. As used herein, the unit mechanism refers to the entire aggregate arrangement, for example, a transmission in the case of an actuator, and a pump rotor and pump stator in the case of a pump, etc.

At least part of the auxiliary unit housing is moreover electrically conductive so that the drive motor and the control and power electronics arranged on the motor electronics circuit board are electrically shielded.

In an embodiment of the present invention, the punch comb arrangement can, for example, be extrusion-coated with a plastic material. The assembly can thereby again be simplified. The assembly can be simplified even further because a free end of the plug pin is inserted into a recess of an electrically conductive housing part of the auxiliary unit housing.

In an embodiment of the present invention, the punch comb arrangement can, for example, be directed approximately radially outward, starting from the engine control electronics circuit board. This is based on an approximately cylindrical housing with a longitudinal axis about which the drive motor rotates. The radial arrangement of the ground connection line is the shortest possible connection to the outside, and thus to the vehicle ground on the side of the vehicle.

In an embodiment of the present invention, a vehicle ground element can, for example, be provided that is adapted to be connected to the engine control unit via the punch comb arrangement. This again improves the electromagnetic shielding of the housing. Starting from the engine control electronics circuit board, a common connector pin section can be provided for the housing ground element and the vehicle ground element.

In an embodiment of the present invention, an electrically conductive partition wall can, for example, be arranged in the auxiliary unit housing which is electrically connected to the electrically conductive housing. The partition wall separates a motor electronics chamber, in which the motor electronics circuit board comprising the motor electronics is arranged, from the drive motor and/or the unit mechanism. The partition wall is a further shield which is, for example, directly adjacent to the motor electronics circuit board and as such is a particularly effective electromagnetic shield.

In an embodiment of the present invention, the unit mechanism can, for example, be a liquid pump comprising a pump rotor and a pump stator, the partition wall being cooled directly by the liquid pumped by the liquid pump. This can be achieved constructively by designing the liquid pump to immediately adjoin the partition wall so that the liquid constantly flows around the partition wall and cools the partition wall with a high cooling capacity. The drive motor can alternatively adjoin the partition wall, the motor rotor being configured as a wet runner. The liquid surrounding the motor rotor thus also directly rinses and cools the partition wall.

To control the motor coils, the motor electronics on the motor electronics circuit board comprises power semiconductors which, depending on the design, must not exceed an intrinsic temperature of 120-150° C. because the semiconductors would be destroyed above this temperature. Cooling via the exclusively air-cooled housing is possible only to a limited extent since the motor electronics is usually accommodated in a hermetically sealed motor electronics chamber so as to provide a good electromagnetic compatibility and to protect the motor electronics from external influences. Cooling capacity is significantly increased by rinsing a side of the partition wall with the pump fluid.

In an embodiment of the present invention, the motor electronics circuit board can, for example, be connected to the partition wall via an electrically non-conductive thermally conductive layer with a defined constant thickness D. The thermally conductive layer can be formed by a thermally conductive paste, but can also be formed by a thermally conductive adhesive that permanently fixes the motor electronics circuit board on the partition wall.

An embodiment of the present invention will be explained in greater detail below under reference to the drawings.

FIG. 1 shows a schematic view of an electric motor vehicle auxiliary unit 10 which is here configured as an electric coolant pump. The electric motor vehicle auxiliary unit can, however, basically also be configured as an electric pump of another type, an electric valve, an electric flap, or another type of auxiliary unit.

Seen in the longitudinal direction, the present electric motor vehicle auxiliary unit 10 is divided into the areas of unit mechanism 12, which in the present instance comprises a pump rotor 24 and a pump stator 22, an electric drive motor 14, which is substantially formed by a plurality of stator-side motor coils 30 and a permanently excited motor rotor 32, and a motor electronics section 16. A motor electronics chamber 17 is provided in the motor electronics section 16, in which motor electronics chamber 17 a motor electronics circuit board 40 is arranged. The motor electronics circuit board 40 comprises control and power electronics 37 for the control and regulation of the electric drive motor 14, and in particular for driving the motor coils 30. The motor coils 30 are electrically connected to the motor electronics circuit board 40 via a plurality of connecting lines 35.

The pump rotor 24 and the motor rotor 32 are arranged on a rotor shaft 26. The electric drive motor 14 has a cylindrical can 34 which separates the wet area in which the motor rotor 32 is arranged from the annular dry area in which the motor coils 30 are arranged. The electric drive motor 14 is accordingly designed as a so-called canned motor or as a wet runner.

The electric motor vehicle auxiliary unit 10 comprises an auxiliary unit housing 15, which is substantially formed by a cylindrical housing cylinder 25, a pump-side housing cover 11, and an electronics-side housing cover 13. An internal partition wall 18 is arranged within the auxiliary unit housing 15, the internal partition wall 18 being located in a transverse plane so as to virtually close off the pump chamber of the unit mechanism 12 from the electric drive motor 14. The liquid pumped by the unit mechanism 12 can, however, also flow into and out of the wet chamber. A further partition wall 20 lying in a transverse plane is moreover arranged within the auxiliary unit housing 15 and hermetically separates the motor electronics chamber 16 from the electric drive motor 14. All parts of the auxiliary unit housing 15 and the further partition wall 20 are made of electrically conductive metal, such as, for example, aluminum.

The motor electronics circuit board 40 is glued to the heat dissipating further partition wall 20 by a thermally conductive layer 42, which is a thermally conductive adhesive, with a defined constant thickness D.

Reference numeral 44 identifies a punch comb arrangement which connects the motor electronics circuit board 40 to an engine control unit 47 via a plug connection 46. The present invention provides that a plug pin of the punch comb arrangement 44 is configured as a housing ground element 48 and that its free end is inserted into a recess 50 of an electrically conductive housing part 52 of the auxiliary unit housing 15 (see in particular also FIG. 2). The punch comb arrangement 44 is basically directed radially outwards starting from the motor electronics circuit board 40. The punch comb arrangement 44 can advantageously be extrusion-coated with a plastic element 58.

Figure 2:
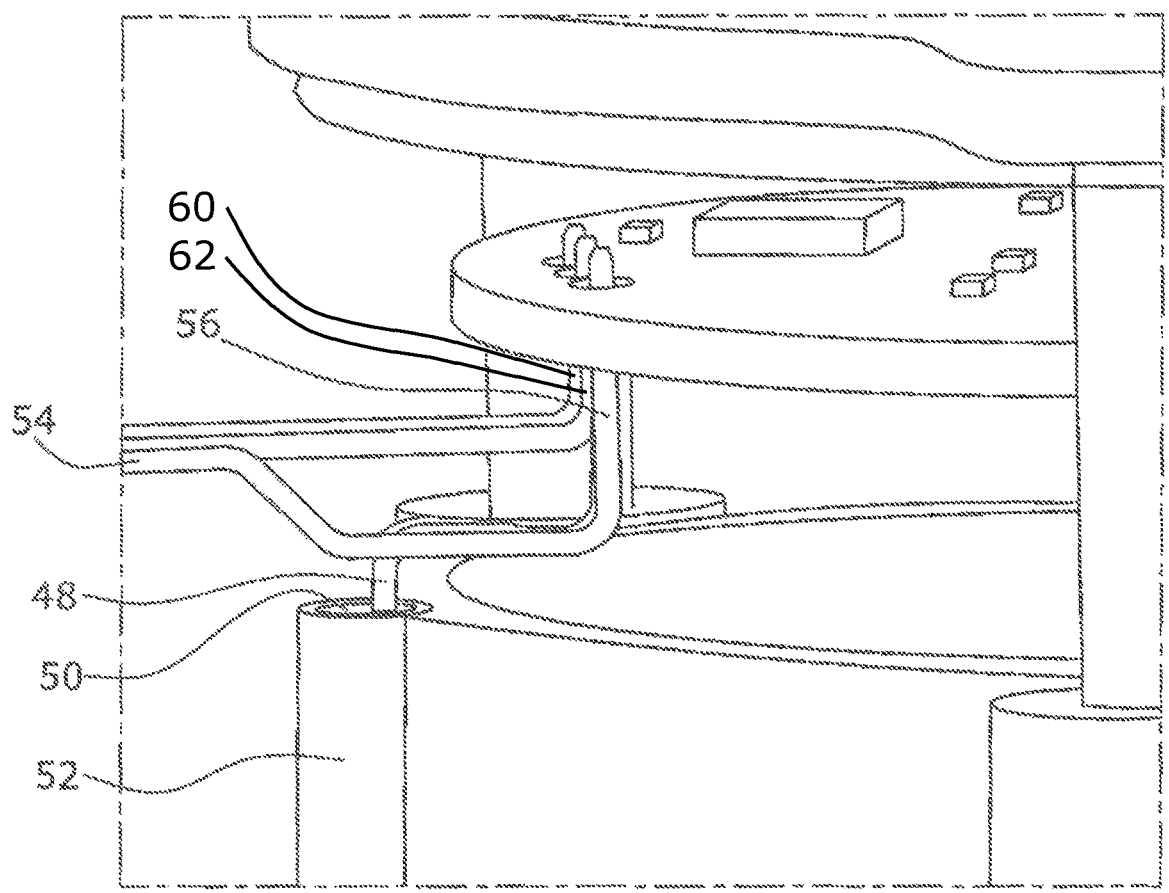
FIG. 2 shows a perspective view of the motor electronics circuit board of the electric motor vehicle auxiliary unit of FIG. 1 without a partition wall.

FIG. 2 shows a perspective view of the motor electronics circuit board 40 of the electric motor vehicle auxiliary unit 10 of FIG. 1 to illustrate the punch comb arrangement 44 without a further partition wall 20. In addition to the housing ground element 48, a vehicle ground element 54 is provided, which can be connected to the engine control unit 47 via the punch comb arrangement 44. The electromagnetic shielding can thereby be improved. Starting from the motor electronics circuit board 40, a common connector pin portion 56 is provided for the housing ground element 48 and the vehicle ground element 54. As can be seen from FIG. 2, further connector pins 60, 62 are provided for the control of the motor electronics circuit board 40.

The present invention is not limited to embodiments described herein; reference should be had to the appended claims.

What is claimed is:

1. An electric motor vehicle auxiliary unit comprising:
    an auxiliary unit housing which is configured to be at least partly electrically conductive;
    an electric drive motor arranged within the auxiliary unit housing, the electric drive motor comprising stator-side motor coils;
    a unit mechanism arranged within the auxiliary unit housing, the unit mechanism being configured to be driven by the electric drive motor;
    a housing ground element;
    a motor electronics circuit board arranged within auxiliary unit housing, the motor electronics circuit board comprising,
        motor electronics comprising control and power electronics, the control and power electronics being configured to control the electric drive motor, and
        at least one housing ground connection which is connected in an electrically conductive manner directly to the auxiliary unit housing via the housing ground element;
    a punch comb arrangement comprising at least two plug pins; and
    a plug connection which is configured to connect the motor electronics circuit board to an engine control unit, the plug connection being electrically connected to the motor electronics circuit board via the punch comb arrangement,
    wherein,
    the housing ground element is designed as a plug pin of the at least two plug pins of the punch comb arrangement.

2. The electrical motor vehicle auxiliary unit as recited in claim 1, wherein the punch comb arrangement is extrusion-coated with a plastic material.

3. The electrical motor vehicle accessory unit as recited in claim 1, wherein,
    the auxiliary unit housing comprises an electrically conductive housing part which comprises a recess,
    the plug pin comprises a free end, and
    the plug pin is inserted into the recess of the electrically conductive housing part of the auxiliary unit housing.

4. The electrical motor vehicle auxiliary unit as recited in claim 1, wherein the punch comb arrangement is directed approximately radially outwards starting from the motor electronics circuit board.

5. The electrical motor vehicle auxiliary unit as recited in claim 1, further comprising:
    a vehicle ground element which is configured to be connected to the engine control unit via the punch comb arrangement.

6. The electrical motor vehicle auxiliary unit as recited in claim 5, further comprising:
    a common plug pin portion for the housing ground element and for the vehicle ground element, the common plug pin portion being arranged to start from the motor electronics circuit board.

7. The electrical motor vehicle auxiliary unit as recited in claim 1, further comprising:
    a motor electronics chamber; and
    an electrically conductive partition wall which is arranged in and electrically connected to the auxiliary unit housing, the electrically conductive partition wall being configured to separate the motor electronics chamber from at least one of the electric drive motor and the unit mechanism.

8. The electric motor vehicle auxiliary unit as recited in claim 7, wherein,
    the unit mechanism is a liquid pump comprising a pump rotor and a pump stator, the liquid pump being configured to pump a liquid, and
    the electrically conductive partition wall is cooled directly by the liquid which is pumped by the liquid pump.

9. The electrical motor vehicle auxiliary unit as recited in claim 7, further comprising,
    an electrically non-conductive thermally conductive layer comprising a defined thickness D, the electrically non-conductive thermally conductive layer being arranged between the motor electronics circuit board and the electrically conductive partition wall.

* * * * *